UNITED STATES PATENT OFFICE.

JACQUES DUCLAUX, OF PARIS, FRANCE.

RECOVERY OF FORMIC ESTERS USED AS SOLVENTS OF CELLULOSE COMPOUNDS.

1,127,871. Specification of Letters Patent. Patented Feb. 9, 1915.

No Drawing. Application filed January 31, 1913. Serial No. 745,382.

*To all whom it may concern:*

Be it known that I, JACQUES DUCLAUX, a citizen of France, residing in Paris, France, have invented certain new and useful Improvements in the Recovery of Formic Esters Used as Solvents of Cellulose Compounds, of which the following is a specification.

Certain organic ester compounds, particularly the higher and lower homologues of acetic ester (or ethyl acetate) are extremely good solvents of nitro-cellulose and other cellulose esters, such for instance as acetyl cellulose. They are not, however, employed industrially for instance in the manufacture of Chardonnet artificial silk or of celluloid, owing to their high cost and the large quantity required due to the want of a satisfactory method of recovering the solvent. It is, however, possible to employ two of these esters, namely, ethyl and methyl formates under very satisfactory conditions as regards economy by the adoption of the following process which constitutes the subject-matter of the present invention, and has for its object the recovery of the vapors of these formates and their regeneration so as to permit the solvents to be used over again. It has been found by experiment that the cost of recovering these ester compounds can be considerably reduced, and a study of the conditions of their formation shows in fact that it is possible to produce them with the full theoretical yield by the direct action of formic acid upon methyl and ethyl alcohol even when largely diluted with water. The only precaution to be taken consists in adding an excess of alcohol in such a manner that the acid is at the commencement of the process in contact with a greater quantity of alcohol than it is able to convert, and it is also necessary to provide rectifying apparatus adapted to separate completely the ester which is formed, from the excess of alcohol, which can be easily effected since their boiling points differ to the extent of approximtely 30° C. Under the above-mentioned conditions the conversion of the formic acid takes place rapidly and is complete, while if an excess of alcohol is not present the conversion is not only incomplete but takes place extremely slowly. The amount of alcohol required varies according to the efficiency of the rectifying apparatus, but in general it is only necessary to employ double the quantity theoretically required for the conversion of the formic acid. Instead of using formic acid itself the reaction with the alcohol can be obtained by a solution of a formate added to an equivalent quantity of an acid even when this acid will not completely replace the formic acid in the formate.

This process for the production of methyl and ethyl formates as applied to the manufacture of artificial silk or other cellulose products having an ester base constitutes a special feature of the invention. The process can be utilized for the treatment of solutions containing either formic acid or formates obtained by the recovery of the vapors of these ester compounds given off to the surrounding air during the manufacture of cellulose products having an ester base according to the invention, and in the case of formate vapor this method of treatment is essential owing to the fact that the recovery of the ester gives only dilute solutions of formates which cannot be employed in the processes already known.

The second part of the process which relates to the recovery of the vapors of ethyl and methyl formates is rendered possible by the property these vapors possess of being immediately saponified by aqueous solutions of alkalis. Experiments have shown that if air containing the vapors of these esters is permitted to bubble through water containing in solution or suspension a basic substance, even though a very weak one, or a salt giving an alkaline reaction, the air is completely freed from these vapors even when it only contains a very small proportion of the ester compounds, such for instance as a few grams per cubic meter. The solution of the vapors of the methyl and ethyl formates in the water is extremely rapid although these formates are themselves only slightly soluble, and this rapidity of solution of the vapors accounts for their rapid decomposition by the alkali, which is a necessary condition in view of the very small proportion of the vapors of the ester compounds which the air contains and which it is necessary, however, to recover owing to their costliness. By the passage of the vapors of formic esters through the alkaline solution, which may for instance consist of lime water or soda lye, the formic acid is recovered in the form of a dissolved formate, while the alcohol which is set free in the form in which it previously existed in the vapors can only be completely collected by passing the vapor through vessels containing water connected in series with one another, such for instance as are used in apparatus employed for continuous rectification, and from this apparatus a dilute solution of alcohol, for instance a 5% solution, is obtained from which pure alcohol can be extracted by rectification. It is also possible and is in fact preferable to supply the vessels provided for recovering the alcohol with an alkaline solution serving to decompose the formic ester, and in this case the liquid issuing from the apparatus contains both the alcohol and the formate and can be employed for the regeneration of the formic ester without previous rectification.

The formate solution obtained as above described, whatever the base combined with the formic acid, is treated by a quantity of strong acid (for example hydrochloric, nitric, sulfuric acid or mixtures of these) which is just sufficient to set free the formic acid. There is then added, if necessary, methyl or ethyl alcohol until an excess of alcohol is present, as already explained above, and by distillation in a rectifying apparatus as already explained a formic ester is first obtained and afterward alcohol which are used over again in the process. All these reactions can be effected with a yield almost equal to the theoretical yield so that the loss of the solvents is extremely small.

The economy of the process can also be increased by employing as solvents of nitrocellulose or other cellulose esters instead of pure methyl or ethyl formates, mixtures of these substances with methyl or ethyl alcohol, the vapors of these alcohols carried away by the air, together with those of the formic esters being both recovered by the same operation.

Various modifications may evidently be made in the process above described in order to meet particular conditions without exceeding the scope of the invention.

Claims:

1. A process for the recovery of formic esters employed as solvents of cellulose compounds in the manufacture of cellulose articles, comprising absorbing the vapors of the solvent in water containing an alkaline agent and adding a strong acid and a large excess of methyl or ethyl alcohol to the dilute solution, and distilling off the formic ester formed.

2. In a process for the recovery of formic esters employed as solvents of cellulose compounds in the manufacture of cellulosic articles, absorbing in water containing an alkaline agent the vapors of the esters from air laden with the vapors.

3. In a process for the recovery of formic esters employed as solvents of cellulose compounds in the manufacture of cellulosic articles, absorbing in water containing an alkaline agent the vapors of the esters from air laden with the vapors and recovering the alcohol and alkaline formates formed.

In witness whereof, I have hereunto signed my name in the presence of two subscribing witnesses.

JACQUES DUCLAUX.

Witnesses:
 LUCIAN MEMMINGER,
 RENÉ BARDY.